United States Patent [19]

Hashimoto et al.

[11] Patent Number: 5,525,418

[45] Date of Patent: Jun. 11, 1996

[54] MAGNETIC RECORDING MEDIUM HAVING A MAGNETIC LAYER CONTAINING FERROMAGNETIC POWDER AND A POLYURETHANE RESIN OBTAINED FROM A POLYOLEFIN POLYOL OR A POLYBUTADIENE POLYOL

[75] Inventors: Hiroshi Hashimoto; Yuichiro Murayama; Masaki Satake; Tsutomu Okita, all of Odawara, Japan

[73] Assignee: Fuji Photo Film Co., Ltd., Kanagawa, Japan

[21] Appl. No.: 364,408

[22] Filed: Dec. 23, 1994

Related U.S. Application Data

[63] Continuation of Ser. No. 45,260, Apr. 13, 1993, abandoned.

[30] Foreign Application Priority Data

Apr. 14, 1992 [JP] Japan .................................. 4-094363

[51] Int. Cl.⁶ ...................................................... G11B 5/00
[52] U.S. Cl. ........................ 428/323; 428/328; 428/329; 428/425.9; 428/694 BU; 428/694 BL; 428/694 BY; 428/694 BM; 428/694 BA; 428/522; 428/900
[58] Field of Search .......................... 428/694 BU, 425.9, 428/694 BM, 694 BA, 900, 694 BL, 694 BY, 323, 328, 329, 522

[56] References Cited

U.S. PATENT DOCUMENTS

| | | | |
|---|---|---|---|
| 4,361,627 | 11/1982 | Ohata | 428/425.9 |
| 4,555,443 | 11/1985 | Kikugawa et al. | 428/336 |
| 4,789,718 | 12/1988 | Noll et al. | 528/49 |
| 5,037,934 | 8/1991 | Yasuda et al. | 528/72 |
| 5,178,952 | 1/1993 | Yamamoto et al. | 428/425.8 |
| 5,278,275 | 1/1994 | Yatsuka et al. | 528/74 |
| 5,415,941 | 5/1995 | Sugyo et al. | 428/425.9 |

FOREIGN PATENT DOCUMENTS

| | | |
|---|---|---|
| 60-229916 | 11/1985 | Japan . |
| 63-130616 | 6/1988 | Japan . |
| 04136016 | 5/1992 | Japan . |

*Primary Examiner*—Stevan A. Resan
*Attorney, Agent, or Firm*—Sughrue, Mion, Zinn, Macpeak & Seas

[57] ABSTRACT

A binder for a magnetic recording medium comprising a polyurethane which is a reaction product obtained from a polyol and a polyisocyanate as principal raw materials. The polyol is an aliphatic polyol with a molecular weight of not lower than 500. The binder has high dispersibility and provides excellent running durability and shelf stability. Also disclosed is a magnetic recording medium having at least one magnetic or non-magnetic layer containing the above-described binder on at least one surface of a non-magnetic support.

18 Claims, No Drawings

MAGNETIC RECORDING MEDIUM HAVING A MAGNETIC LAYER CONTAINING FERROMAGNETIC POWDER AND A POLYURETHANE RESIN OBTAINED FROM A POLYOLEFIN POLYOL OR A POLYBUTADIENE POLYOL

This is a continuation of application Ser. No. 08/045,260, filed Apr. 13, 1993 now abandoned.

BACKGROUND OF THE INVENTION

The present invention relates to a binder for a magnetic recording medium and also to a magnetic recording medium using the binder.

Magnetic recording mediums are widely used for sound recording tapes, video tapes and floppy disks. A typical magnetic recording medium has a magnetic layer stacked on a non-magnetic support. The magnetic layer is made of a ferromagnetic powder dispersed in a binder.

Magnetic recording mediums are required to be on high levels in various characteristics such as electromagnetic transducing characteristics, running durability and running performance. More specifically, audio tapes for recording and reproducing music are demanded to have higher original sound reproducing capability. Video tapes are demanded to be excellent in original picture reproducing capability and other electromagnetic transducing characteristics.

Thus, magnetic recording mediums are demanded to have excellent running durability, as described above, as well as excellent electromagnetic transducing characteristics. To obtain excellent running durability, an abrasive and a lubricant are generally added to the magnetic layer.

However, it is necessary in order to obtain the required running durability by an abrasive to increase the amount of abrasive added to the magnetic layer to some extent. Consequently, the content of ferromagnetic powder lowers. When an abrasive having a relatively large particle size is used in order to obtain excellent running durability, the abrasive is likely to project from the surface of the magnetic layer. Accordingly, it is likely that the improvement in the running durability by addition of an abrasive will result in deterioration of the electromagnetic transducing characteristics.

In order to improve the running durability by adding a lubricant, it is necessary to increase the amount of lubricant added. Consequently, it is likely that the binder will be plasticized and hence the durability of the magnetic layer will deteriorate.

A binder, which is one of the principal components of the magnetic layer, also performs an important roll in the improvement of the durability and electromagnetic transducing characteristics, as a matter of course. Examples of binders which have heretofore been used include vinyl chloride resins, cellulose resins, urethane resins, acrylic resins, etc. However, these conventional binders involve the problems that the resulting magnetic layer is inferior in wear resistance and that members of the magnetic tape running system are contaminated.

To solve these problems, a method wherein the hardness of the magnetic layer is increased by using a rigid binder has been adopted. However, an increase in the hardness of the magnetic layer causes the magnetic layer to become markedly brittle, which gives rise to problems such as occurrence of a dropout due to contact between the magnetic recording medium and a magnetic head, and deterioration of still characteristics.

As another prior art for solving the above-described problems, a magnetic recording medium has been disclosed in Japanese Patent Application Laid-Open (KOKAI) Nos. 62-134819 (1987) and 62-208423 (1987). The disclosed magnetic recording medium comprises a vinyl chloride copolymer having a hydroxyl group that is not directly coupled to the main chain (through an alkyl or alkyl ester group) and a polar group and contains no vinyl alcohol as a copolymer component. It is stated in the above-mentioned literature that since the vinyl alcohol, which is used as a copolymer component, is produced through a saponification process, the polymer that contains the vinyl alcohol hardly changes with time, and hence the magnetic recording medium has a minimal change with time and is superior in durability, and that since the vinyl chloride copolymer has a hydroxyl group and a polar group, the magnetic recording medium is also superior in the dispersibility of the ferromagnetic powder and provides excellent electromagnetic transducing characteristics.

With the above-described magnetic recording medium, however, sufficiently excellent durability and electromagnetic transducing characteristics cannot be obtained because the strength of the magnetic layer is not sufficiently high and the smoothness of the magnetic layer surface is not satisfactory. Accordingly, the prior art cannot be said to be a sufficiently excellent magnetic recording medium when used as an S-VHS tape or an 8-mm video tape, for example, which are required to have an extremely high smoothness and excellent electromagnetic transducing characteristics.

Further, it is disclosed in Japanese Patent Application Post-Exam Publication No. 63-55549 (1988) that a modified polyurethane resin containing a multivalent OH group and $SO_3M$ (wherein M is an alkali metal or a quaternary ammonium ion) is employed as a magnetic coating composition in order to improve the durability of the coating film. The publication states that the use of such a binder enables improvements in the surface gloss, blocking tendency, adhesive properties, etc.

There are conventional binders comprising polyurethane as follows: A polyurethane binder employing a polyester polyol as a polyol and having $—SO_3M$ is disclosed in Japanese Patent Application Post-Exam Publication No. 58-41565 (1983). A polyurethane binder obtained from a polycarbonate containing a hydroxyl end group and a diisocyanate is disclosed in Japanese Patent Application Laid-Open (KOKAI) No. 59-198530 (1984). A polyurethane binder formed from a polycaprolactone containing a carboxyl group is disclosed in Japanese Patent Application Laid-Open (KOKAI) No. 62-201918 (1987). A polyurethane binder formed from a polyether containing a carboxyl group is disclosed in Japanese Patent Application Laid-Open (KOKAI) No. 61-190717 (1986).

These polyurethane binders exhibit excellent characteristics, which are inherent in polyurethane, but they are unsatisfactory in terms of the dispersibility of the ferromagnetic powder and the long-term shelf stability and also unsatisfactory in terms of the durability under temperature and relative humidity conditions over a wide range.

The polyol components of these polyurethane binders all have a hydrophilic segment, for example, an ester linkage, an ether linkage, a carbonate linkage, etc. The polarity of such a hydrophilic segment is not so strong as that of $—SO_3M$ or $—COOH$ group. Therefore, the hydrophilic segment has no function of adsorption on the surface of the ferromagnetic powder. However, in a solution the hydrophilic segment may form a weak hydrogen bond, which will reduce the spread of the polyurethane molecular chain adsorbed on the surface of the magnetic material. For this reason, the adsorption volume of the binder around the ferromagnetic powder is small, and the dispersibility and dispersion stability lower. In addition, it is considered that the hydrophilic segment in the polyol increases the dependence of the mechanical properties of the magnetic coating film on the temperature and relative humidity and hence increases the dependence of the running durability on the temperature and relative humidity and also lowers the long-term shelf stability.

It is an object of the present invention to provide a binder for a magnetic recording medium which has extremely high dispersibility and which is superior in long-term shelf stability and in durability under temperature and relative humidity conditions over a wide range, and also provide a magnetic recording medium using the above-described binder.

SUMMARY OF THE INVENTION

The present invention relates to a binder for a magnetic recording medium and a magnetic recording medium using the same. The binder for a magnetic recording medium comprises a polyurethane which is a reaction product obtained by using a polyol and a polyisocyanate as principal raw materials, and an aliphatic polyol is used as the polyol. The magnetic recording medium has a magnetic layer containing a ferromagnetic powder and a binder, which is formed on at least one surface of a non-magnetic support. The binder comprises a polyurethane which is a reaction product obtained from an aliphatic polyol and a polyisocyanate as principal raw materials.

DESCRIPTION OF THE PREFERRED EMBODIMENT

The binder for a magnetic recording medium according to the present invention comprises a polyurethane produced from a raw material containing an aliphatic polyol and a polyisocyanate as principal raw materials and further containing various additives including a chain extender. The aliphatic polyol is preferably a polyol having a molecular weight of from 500 to 5,000 and containing an OH group at the end of a hydrocarbon chain. The OH group may be present at a position other than the end of the carbon chain. The molecular weight is preferably in the range of from 800 to 3,000. A molecular weight smaller than the lower limit of the above range provides unfavorable dispersibility. A molecular weight exceeding the upper limit of the above range lowers the solubility of the compound in a solvent, resulting in a lowering in the dispersibility. The carbon chain may be either a straight chain or a branched chain. Further, the carbon chain may be either saturated or unsaturated.

When an unsaturated polyolefin polyol or polybutadiene polyol is used as the aliphatic polyol, it is preferable to employ a polyol having a smaller number of unsaturated double bonds.

The polyolefin polyol content in the polyurethane is preferably in the range of from 20 wt % to 90 wt %. If the polyolefin polyol content is lower than the lower limit of the above range, the dispersibility is unfavorable, and the effectiveness of durability is small. On the other hand, if the polyolefin polyol content is higher than the upper limit of the above range, the glass transition temperature (Tg) lowers, so that it becomes difficult to control the physical properties of the resulting composition.

The molecular weight of the polyurethane is preferably in the range of from 10,000 to 150,000 in terms of the weight-average molecular weight. If the molecular weight is higher than the upper limit of the above range, the viscosity is undesirably high, so that the dispersibility lowers. If the molecular weight is lower than the lower limit of the above range, the mechanical strength is low, so that the durability deteriorates.

Preferable examples of the polyisocyanate used in the present invention are aromatic polyisocyanates such as MDI (4,4'-diphenylmethane diisocyanate), TDI (tolylene diisocyanate), and XDI (xylylene diisocyanate). Since the polyolefin polyol segment is soft, an aromatic diisocyanate enables easier adjustment of the physical properties.

Additives such as a chain extender may be used in addition to the polyol and the polyisocyanate. Examples of chain extenders usable in the present invention include glycols such as ethylene glycol, 1,4-butanediol, 2,3-butanediol, bisphenol A dihydroxyethyl ether, hydroquinone dihydroxyethyl ether, etc., and diamines such as diphenylmethanediamine, m-phenylenediamine, etc.

The end group of the polyurethane molecule is preferably an OH group. The OH group performs a crosslinking reaction with an isocyanate curing agent in the magnetic layer to enhance the strength of the magnetic layer coating film.

The glass transition temperature (Tg) of the polyurethane is preferably in the range of from $-20°$ C. to $+50°$ C. If the glass transition temperature is lower than the lower limit of the above range, the blocking tendency of the magnetic coating film before curing is weak. If the glass transition temperature is higher than the upper limit of the above range, the magnetic coating film becomes brittle, which is unfavorable from the viewpoint of durability.

The polyurethane binder of the present invention preferably contains at least one polar group selected from among $-SO_3M$, $-OSO_3M$, $-COOM$, $-PO_3M'_2$, $-OPO_3M'_2$, $-NR_2$, $-N^+R_3X^-$, $-N^+R_2R'SO_3^-$, and $-N^+R_2R'COO^-$ (wherein M is a hydrogen atom, an alkali metal, an alkali earth metal, or an ammonium salt; M' is a hydrogen atom, an alkali metal, an alkali earth metal, an ammonium salt, or an alkyl group; R and R' are each an alkyl group; and X is a halogen). The content of the polar group is preferably in the range of $1\times10^{-6}$ to $2\times10^{-4}$ equivalents per gram of the polymer. If the polar group content is higher than $2\times10^{-4}$ equivalents, the viscosity rises, and the dispersibility is likely to lower. If the polar group content is lower than $1\times10^{-6}$ equivalents, the dispersibility is likely to lower.

When the binder of the present invention is used for a magnetic layer, a vinyl chloride synthetic resin may be used in combination with the polyurethane of the present invention. The degree of polymerization of a vinyl chloride resin which can be used in combination with the polyurethane binder of the present invention is preferably in the range of from 200 to 600, particularly preferably from 250 to 450. A vinyl chloride resin which is obtained by copolymerization of a vinyl monomer, e.g., vinyl acetate, vinyl alcohol, vinylidene chloride, acrylonitrile, etc., may also be used.

In addition to the polyurethane and vinyl chloride resin, various kinds of synthetic resin may be used for formation of each magnetic layer. Examples of usable synthetic resins include ethylene-vinyl acetate copolymer, a cellulose derivative, e.g., nitrocellulose resin, an acrylic resin, a polyvinyl acetal resin, a polyvinyl butyral resin, an epoxy resin, and a phenoxy resin. These synthetic resins may be used alone or as a mixture of two or more of them.

When another synthetic resin is used to form a magnetic layer in combination with the polyurethane binder of the present invention, the urethane content in the binder is preferably not lower than 10 wt %, more preferably not lower than 20 wt %. The vinyl chloride resin content in the binder is preferably not higher than 80 wt %, more preferably not higher than 70 wt %.

It is also possible to use a curing agent, e.g., a polyisocyanate compound in combination with the binder of the present invention. Examples of polyisocyanate compounds usable in the present invention include a reaction product obtained from 3 mols of tolylene diisocyanate and 1 mol of trimethylolpropane (e.g., Desmodur L-75 (Bayer), a reaction product obtained from 3 mols of a diisocyanate, e.g., xylylene diisocyanate or hexamethylene diisocyanate, and 1 mol of trimethylolpropane, a burette addition compound obtained from 3 mols of hexamethylene diisocyanate, an isocyanurate compound containing 5 mols of tolylene diisocyanate, an isocyanurate addition compound comprising 3 mols of tolylene diisocyanate and 2 mols of hexamethylene diisocyanate, and isophorone diisocyanate and diphenylmethane diisocyanate polymers.

The polyisocyanate compound contained in the magnetic layer is preferably contained in the binder in an amount in the range of from 10 wt % to 50 wt %, more preferably from 20 wt % to 40 wt %.

If an electron radiation curing process is carried out, a compound having a reactive double bond (e.g., urethane acrylate) may be used.

In general, the total amount of the resin component and the curing agent (i.e., the amount of the binder) is preferably in the range of from 15 parts to 40 parts by weight, more preferably from 20 parts to 30 parts by weight, per 100 parts by weight of a ferromagnetic powder.

The ferromagnetic powder used for the magnetic recording medium of the present invention is a ferromagnetic iron oxide powder, a cobalt-containing ferromagnetic iron oxide powder or a ferromagnetic alloy powder which has a $S_{BET}$ specific surface area of not smaller than 40 m$^2$/g (preferably not smaller than 50 m$^2$/g) and a crystallite size of not larger than 35 nm, preferably not larger than 25 nm. Examples of ferromagnetic powder usable in the present invention include Fe, Ni, Fe—Co, Fe—Ni, Co—Ni, Co—Ni—Fe, Ba—Fe, CrO$_2$ and alloys containing aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, mercury, lead, phosphorus, lanthanum, cerium, praseodymium, neodymium, tellurium, or bismuth in an amount not more than 20 wt % of the metal component. It is also possible to use a ferromagnetic metal powder containing a small amount of water, a hydroxide or an oxide.

Methods of producing these ferromagnetic powders are already known. A ferromagnetic powder used in the present invention may be produced according to a known method.

There is no specific restriction on the shape of the ferromagnetic powder used in the present invention. Ferromagnetic powders in the form of needle, granule, dice, rice grain or plate may be generally used. It is particularly preferable to use a needle-shaped ferromagnetic powder.

The above-described resin component, curing agent and ferromagnetic powder are kneaded and dispersed in a solvent, which is usually used to prepare a magnetic coating material, e.g., methyl ethyl ketone, dioxane, cyclohexanone, ethyl acetate, etc. thereby preparing a magnetic coating material. The kneading process may be carried out according to a conventional method.

It should be noted that the magnetic coating material may contain in addition to the above-described components additives or fillers which are usually used, such as an abrasive, e.g., α-Al$_2$O$_3$, Cr$_2$O$_3$, etc., an antistatic agent, e.g., carbon black, a lubricant, e.g., a fatty acid, fatty acid ester, silicone oil, etc., and a dispersant.

The magnetic coating material prepared using the above-described constituent materials is coated on a non-magnetic support to form a magnetic layer.

For example, the magnetic recording medium of the present invention is produced by a method wherein the surface of a non-magnetic support, which is traveling, is coated with a magnetic layer coating solution so that the dry film thickness of the magnetic layer is preferably in the range of from 0.5 μm to 10 μm, more preferably from 1.5 μm to 7.0 μm. A plurality of magnetic coating materials may be successively or simultaneously coated to form a multi-layer structure.

Examples of coating machines usable for coating the magnetic coating material include an air-doctor coater, a blade coater, a rod coater, an extrusion coater, an air-knife coater, a squeeze coater, an impregnation coater, a reverse-roll coater, a transfer roll coater, a gravure coater, a kiss-roll coater, a cast coater, a spray coater, a spin coater, etc.

With regard to these coating machines, for example, "Latest Coating Techniques" (May 31, 1983), published by K. K. Sogo Gijutsu Center, can be referred to.

When the present invention is applied to a magnetic recording medium comprising two or more layers, for example, the following coating apparatuses and methods may be proposed:

(1) First, a lower layer is coated by a coating machine which is generally used for coating a magnetic coating material, e.g., a gravure coater, a roll coater, a blade coater, an extrusion coater, etc., and while the coated lower layer is wet, an upper layer is coated by using a support pressing extrusion coating apparatus which is disclosed in Japanese Patent Application Post-Exam Publication No. 01-46186 (1989) and Japanese Patent Application Laid-Open (KOKAI) Nos. 60-238179 (1985) and 02-265672 (1990).

(2) Upper and lower layers are coated almost simultaneously by using a single coating head incorporating two coating solution feed slits such as that disclosed in Japanese Patent Application Laid-Open (KOKAI) Nos. 63-88080 (1988), 02-17971 (1990) and 02-265672 (1990).

(3) Upper and lower layers are coated almost simultaneously by using an extrusion coating apparatus with a backup roll which is disclosed in Japanese Patent Application Laid-Open (KOKAI) No. 02-174965 (1990).

The non-magnetic support used in the present invention may have a backing layer provided on the surface thereof where no magnetic coating material is coated. In general, the backing layer is provided by coating a backing layer forming coating material, which is obtained by dispersing granular components such as an abrasive and an antistatic agent and a binder in an organic solvent, on the surface of the non-magnetic support where no magnetic coating material is coated.

It should be noted that an adhesive layer may be provided on each of the surfaces of the non-magnetic support where the magnetic coating material and the backing layer forming coating material are coated, respectively.

The coated magnetic coating material is dried after the ferromagnetic powder contained in the magnetic coating layer has been subjected to magnetic field orientation.

After being dried, the coating layer is subjected to a surface smoothing treatment. For example, supercalender rolls may be used for the surface smoothing treatment. By the surface smoothing treatment, voids resulting from the removal of the solvent during the drying process disappear, and the packing factor of the ferromagnetic powder in the magnetic layer increases. Accordingly, a magnetic recording medium having high electromagnetic transducing characteristics can be obtained.

The magnetic recording medium of the present invention preferably has a surface which has such an extremely excellent smoothness that the center line average height of the surface is not larger than 4 nm (preferably in the range of from 1 nm to 3 nm) at a cut-off value of 0.25 mm. To obtain the required smoothness, for example, the recording layer formed by selecting a specific ferromagnetic powder and binder is subjected to the calendering treatment, as described above. In the calendering treatment, calender rolls are preferably operated under the conditions that the temperature is in the range of from 60° C. to 100° C. and the pressure is in the range of from 100 kg/cm$^2$ to 400 kg/cm$^2$.

The laminate cured in this way is cut into a desired shape.

The cutting may be carried out under usual conditions by using an ordinary cutting machine, for example, a slitter.

The binder for a magnetic recording medium according to the present invention comprises a polyurethane obtained by a reaction of a polyol with a polyisocyanate, and an aliphatic polyol is used as the polyol. Accordingly, the resulting polyurethane has high dispersibility. Therefore, a magnetic layer obtained from a coating composition containing a magnetic powder and the binder of the present invention exhibits extremely high dispersibility of the magnetic powder and is superior in long-term shelf stability and also excellent in durability under temperature and relative humidity conditions over a wide range.

The present invention will be described below more specifically by way of synthesis examples of polyurethane binders for magnetic recording mediums according to the present invention and examples of magnetic recording mediums produced by using the binders.

Synthesis Examples 1 to 8

Each monomer composition A was dissolved in 226 g of a mixed solvent of toluene and cyclohexanone (1:1) in a 1,000-ml three-necked flask equipped with a condenser and a stirrer and previously replaced with nitrogen. The associated monomer composition B was added to the resulting solution, and 0.031 g (0.049 mol) of di-n-butyl tin dilaurate was further added thereto as a catalyst. The mixture was stirred for 6 hours under heating at 90° C. in a stream of nitrogen, thereby obtaining the following polyurethane solution.

| Synthesis Example | Monomer composition A | | Monomer composition B | |
|---|---|---|---|---|
| 1 | Polyolefin polyol (mol. wt.: 2,000 OH value: 52.4 "Polyter HA" manufactured by Mitsubishi Chemical Industries, Ltd.) | 120 g | MDI | 25 g |
| | Neopentyl glycol | 4.4 g | | |
| | 5-sodium sulfoisophthalic dihydroxyethyl | 3.2 g | | |
| 2 | Polyolefin polyol (mol. wt.: 2,000 OH value: 52.4 "Polyter HA" manufactured by Mitsubishi Chemical Industries, Ltd.) | 120 g | MDI | 25 g |
| | 1,4-butanediol | 4.4 g | | |
| | 5-sodium sulfoisophthalic dihydroxyethyl | 3.2 g | | |
| 3 | Polyolefin polyol (mol. wt.: 2,000 OH value: 52.4 "Polyter HA" manufactured by Mitsubishi Chemical Industries, Ltd.) | 120 g | MDI | 17.4 g |
| | Bisphenol A dihydroxyethyl ether | 9.8 g | | |
| | 5-sodium sulfoisophthalic dihydroxyethyl | 3.2 g | | |
| 4 | Polyolefin polyol (mol. wt.: 2,000 OH value: 52.4 "Polyter HA" manufactured by Mitsubishi Chemical Industries, Ltd.) | 120 g | MDI | 25 g |
| | Neopentyl glycol | 4.4 g | | |
| | Dimethylol propionic acid | 1.1 g | | |
| 5 | Polycaprolactone polyol (mol. wt.: 2,000 OH value: 52.4) | 120 g | MDI | 25 g |
| | Neopentyl glycol | 4.4 g | | |
| | 5-sodium sulfoisophthalic dihydroxyethyl | 3.2 g | | |
| 6 | Polybutylene adipate polyol (mol. wt.: 2,000 OH value: 52.4) | 120 g | MDI | 25 g |
| | Neopentyl glycol | 4.4 g | | |
| | 5-sodium sulfoisophthalic dihydroxyethyl | 3.2 g | | |
| 7 | Polyhexamethylene carbonate polyol (mol. wt.: 2,000 OH value: 52.4) | 120 g | MDI | 25 g |
| | Neopentyl glycol | 4.4 g | | |
| | 5-sodium sulfoisophthalic dihydroxyethyl | 3.2 g | | |
| 8 | Polycaprolactone polyol (mol. wt.: 2,000 OH value: 52.4) | 120 g | MDI | 25 g |
| | Neopentyl glycol | 4.4 g | | |
| | Dimethylol propionic acid | 3.2 g | | |

The characteristics of the polyurethanes thus obtained are shown in Table 1 below.

TABLE 1

| Synthesis Example | Molecular weight Mw | Polar group Kind | Polar group Concentration (eq/g) | Tg (°C.) |
|---|---|---|---|---|
| 1 | 53,000 | SO$_3$Na | 6 × 10$^{-5}$ | 0 |
| 2 | 61,000 | SO$_3$Na | 6 × 10$^{-5}$ | −5 |
| 3 | 48,000 | SO$_3$Na | 6 × 10$^{-5}$ | 20 |
| 4 | 71,000 | COOH | 6 × 10$^{-5}$ | 3 |
| 5 | 58,000 | SO$_3$Na | 6 × 10$^{-5}$ | 5 |
| 6 | 46,000 | SO$_3$Na | 6 × 10$^{-5}$ | 2 |
| 7 | 63,000 | SO$_3$Na | 6 × 10$^{-5}$ | 5 |
| 8 | 62,000 | COOH | 6 × 10$^{-5}$ | 0 |

EXAMPLES 1 TO 4

110 parts by weight of a ferromagnetic alloy powder (composition: iron 94 wt %, zinc 4 wt %, and nickel 2 wt %; coercive force (Hc): 1,500 Oe; and crystallite size: 20 nm) was finely comminuted for 10 minutes in an open kneader. Then, the following materials were added to the ferromagnetic alloy powder:

| | |
|---|---|
| Polyurethane (Sample Nos. 1 to 4 of Synthesis Examples 1 to 4) | 20 parts by weight (solid content) |
| Methyl ethyl ketone | 60 parts by weight |

The mixture was kneaded for 60 minutes. Then, the following materials were added to the kneaded mixture:

| | |
|---|---|
| Abrasive ($Al_2O_3$, particle size: 0.3 μm) | 2 parts by weight |
| Carbon black (particle size: 400 nm) | 2 parts by weight |
| Methyl ethyl ketone/toluene = 1/1 | 200 parts by weight |

The mixture was stirred for 120 minutes in a sand mill to disperse the additives. Then, the following materials were added to the resulting dispersion:

| | |
|---|---|
| Polyisocyanate (Coronate 3041, manufactured by Nippon Polyurethane Industry Co., Ltd.) | 5 parts by weight (solid content) |
| sec-butyl stearate | 1 part by weight |
| Butoxyethyl stearate | 1 part by weight |
| stearic acid | 1 part by weight |
| Methyl ethyl ketone | 50 parts by weight |

The mixture was further stirred for 20 minutes and then filtered through a filter having an average pore size of 1 μm to prepare a magnetic coating material. The resulting coating material was coated on the surface of a polyethylene terephthalate support of 10 μm in thickness by using a reverse roll so that the dry film thickness was 2.5 μm.

While the magnetic coating material was undried, the coated non-magnetic support was subjected to magnetic field orientation by using a magnet of 3,000 gauss and dried. Thereafter, the resulting magnetic recording medium was calendered by using a combination of 7 metal rolls (speed: 100 m/min; linear pressure: 300 kg/cm; and temperature: 90° C.), and then slit into a tape of 8 mm in width, thus preparing an 8-mm video tape as a sample.

Comparative Examples 1 to 4

8-mm video tapes were produced in the same way as in Example 1 except that the polyurethanes of Synthesis Examples 5 to 8 were used in place of the polyurethane of Example 1.

Then, the characteristics of the video tapes of Examples and those of Comparative Examples were measured by the following methods. Measuring methods:
(1) Electromagnetic transducing characteristics:

A signal was recorded on each sample tape by using a Hi8-VTR (TR-705, a product of Sony Corporation) and reproduced. During the playback, the S/N ratio was measured with a noise meter and expressed in a value relative to the value of the tape of Comparative Example 4, which was defined as 0 dB.
(2) Running performance:

Each sample tape was wound around a stainless steel pole at a winding angle of 180° under a tension ($T_1$) of 50 g. A tension ($T_2$) required for running the sample at a speed of 3.3 cm/sec. under the above-described condition was measured. The friction coefficient μ of the tape was determined from the following formula on the basis of the measured value:

$$\mu = 1/\pi \cdot \ln(T_2/T_1)$$

The measurement of the friction coefficient was carried out under the conditions: 25° C. and 70% RH.
(3) Durability:

Each sample tape was subjected to still playback by the same VTR as that used for the measurement of electromagnetic transducing characteristics without activating the still playback limiting mechanism, and a time taken until the playback output reached 50% of the recording signal was measured as still durability.
(4) Repeated running durability:

Each sample of 90 minute-long video tape was continuously repeated 100 times by using the same VTR as that used for the measurement of electromagnetic transducing characteristics under each of the environmental conditions: 0° C. and 10% RH; 0° C. and 70% RH; and 40° C. and 70% RH. Thereafter, contamination on the video head was observed. Further, the video output was continuously recorded, and a lowering in the output was measured. Video head contamination:

○ . . . no contamination was recognized.

Δ . . . contamination was recognized when a contaminated portion was wiped.

x . . . contamination was recognized even by visual observation
(5) Surface roughness Ra:

The surface roughness of each sample tape was determined as a center line average height Ra by a light interference method using a digital optical profilometer (manufactured by WYKO) at a cut-off value of 0.25 mm.
(6) Repeated running durability after storage under high-temperature and high-humidity conditions:

Each sample tape was stored for 2 weeks under environmental conditions of 60° C. and 90% RH. Thereafter, the repeated running durability of the tape was evaluated in the same way as in (4) under environmental conditions of 23° C. and 30% RH.
(7) Calender roll contamination:

Each sample tape of 300 m in length was calendered, and contamination on the roll surface after the calendering process was observed.

x . . . contamination was recognized by visual observation

○ . . . no contamination was observed

The results of these tests are shown in Tables 2 and 3 below.

TABLE 2

| Polyurethane | | Electromagnetic transducing characteristics S/N (dB) | Squareness ratio SQ | Surface roughness Ra (nm) |
|---|---|---|---|---|
| Polyol | Polar group | | | |
| Ex. | | | | |
| 1 polyolefin | $SO_3Na$ | 2.3 | 0.94 | 2.1 |
| 2 polyolefin | $SO_3Na$ | 2.3 | 0.93 | 2.2 |

TABLE 2-continued

| | Polyurethane | | Electromagnetic transducing characteristics SIN (dB) | Squareness ratio SQ | Surface roughness Ra (nm) |
|---|---|---|---|---|---|
| | Polyol | Polar group | | | |
| 3 | polyolefin | SO$_3$Na | 2.5 | 0.94 | 2.0 |
| 4 | polyolefin | COOH | 1.9 | 0.93 | 2.4 |
| Comp. Ex. | | | | | |
| 1 | polycaprolactone | SO$_3$Na | 0.4 | 0.88 | 3.3 |
| 2 | polybutylene adipate | SO$_3$Na | 0.5 | 0.88 | 3.5 |
| 3 | polycarbonate | SO$_3$Na | 0.4 | 0.88 | 3.5 |
| 4 | polycaprolactone | COOH | 0.0 | 0.86 | 3.8 |

TABLE 3

| | Repeated running durability | | | | Repeated running durability after 2 week storage at 60° C. & 90% RH (dB) | Contamination on calender roll |
|---|---|---|---|---|---|---|
| | 0° C. | | 40° C. | | | |
| | 10% RH (dB) | 70% RH (dB) | 10% RH (dB) | 70% RH (dB) | | |
| Ex. | | | | | | |
| 1 | ○-0.2 | ○-0.2 | ○-0.2 | ○-0.2 | ○-0.2 | ○ |
| 2 | ○-0.3 | ○-0.3 | ○-0.3 | ○-0.3 | ○-0.5 | ○ |
| 3 | ○-0.3 | ○-0.3 | ○-0.3 | ○-0.3 | ○-0.5 | ○ |
| 4 | ○-0.4 | ○-0.4 | ○-0.4 | ○-0.4 | ○-0.4 | ○ |
| Comp. Ex. | | | | | | |
| 1 | Δ-1.3 | Δ-1.3 | Δ-1.3 | X-3.8 | X-4.5 | X |
| 2 | X-2.6 | X-2.9 | X-3.2 | X-4.5 | X-7.5 | ○ |
| 3 | X-2.8 | Δ-1.1 | X-2.5 | Δ-1.1 | Δ-2.1 | X |
| 4 | Δ-1.6 | Δ-1.6 | Δ-1.6 | X-3.4 | X-4.8 | X |

Synthesis Examples 9 to 16

Each raw material composition A shown in Table 4 was dissolved in 226 g of a mixed solvent of toluene and cyclohexanone (1:1) in a 1,000-ml three-necked flask equipped with a condenser and a stirrer and previously replaced with nitrogen. The associated diisocyanate shown in Table 4 was added to the resulting solution, and 0.031 g (0.049 mol) of di-n-butyl tin dilaurate was further added thereto as a catalyst. The mixture was stirred for 6 hours under heating at 90° C. in a stream of nitrogen, thereby obtaining a polyurethane solution.

TABLE 4

| Substance | Mol. wt. | Polyurethane raw material composition (g) Synthesis Ex. | | | | | | | |
|---|---|---|---|---|---|---|---|---|---|
| | | 9 | 10 | 11 | 12 | 13 | 14 | 15 | 16 |
| Polybutadiene polyol (G-1000* OH value: 71.6) | 1400 | 112 | | | | | | | |
| Polybutadiene polyol (G-2000* OH value: 51.6) | 1990 | | 139.3 | | 139.3 | 99.5 | | | |
| Polybutadiene polyol (G-3000* OH value: 30.4) | 3070 | | | 214.9 | | | | | |
| Polycaprolactone polyol | 2000 | | | | | 40 | 140 | | |
| Polytetramethylene carbonate polyol | 2000 | | | | | | | 140 | |
| Polytetramethylene glycol | 2000 | | | | | | | | 140 |
| Ethylene glycol | 62 | | 0.93 | | | 0.93 | 0.93 | 0.93 | 0.93 |
| Neopentyl glycol | 104 | 1.04 | | 1.56 | 2.08 | | | | |
| 5-sodium sulfoisophthalic dihydroxyethyl | 356 | 3.56 | 5.34 | 5.34 | | 5.34 | 5.34 | 5.34 | 5.34 |
| Dimethylol propionic acid | 134 | | | | 1.34 | | | | |
| MDI | 250 | 25 | 25 | | 25 | 25 | 25 | 25 | 25 |
| TDI | 174 | | | 17.4 | | | | | |

TABLE 4-continued

| | Mol. | Polyurethane raw material composition (g) Synthesis Ex. | | | | | | |
|---|---|---|---|---|---|---|---|---|
| Substance | wt. | 9 | 10 | 11 | 12 | 13 | 14 | 15 | 16 |

*G-1000, G-2000 and G-3000 are manufactured by Nippon Soda Co., Ltd.

The characteristics of the polyurethanes thus obtained are shown in Table 5 below.

TABLE 5

| Synthesis Example | Molecular weight Mw | Polar group Kind | Polar group Concentration (eq/g) | Tg (°C.) |
|---|---|---|---|---|
| 9 | 48,000 | $SO_3Na$ | $7.1 \times 10^{-5}$ | −5 |
| 10 | 59,000 | $SO_3Na$ | $8.8 \times 10^{-5}$ | 0 |
| 11 | 73,000 | $SO_3Na$ | $6.3 \times 10^{-5}$ | 15 |
| 12 | 52,000 | COOH | $6.0 \times 10^{-5}$ | 10 |
| 13 | 98,000 | $So_3Na$ | $8.8 \times 10^{-5}$ | 3 |
| 14 | 55,000 | $SO_3Na$ | $8.8 \times 10^{-5}$ | 2 |
| 15 | 63,000 | $SO_3Na$ | $8.8 \times 10^{-5}$ | 0 |
| 16 | 51,000 | $SO_3Na$ | $8.8 \times 10^{-5}$ | −6 |

EXAMPLES 5 to 9

100 parts by weight of a ferromagnetic alloy powder (composition: iron 94 wt %, zinc 4 wt %, and nickel 2 wt %; coercive force (Hc): 1,500 Oe; and crystallite size: 20 nm) was finely comminuted for 10 minutes in an open kneader. Then, 10 parts by weight of a compound ($SO_3Na$ $6\times10^{-5}$ eq/g; epoxy group=$10^{-3}$ eq/g; and weight-average molecular weight=30,000) obtained by adding hydroxyethyl sulfonate sodium salt to a copolymer of vinyl chloride, vinyl acetate and glycidyl methacrylate (86:9:5) and 60 parts by weight of methyl ethyl ketone were added to the ferromagnetic alloy powder, and the mixture was kneaded for 60 minutes. Then, the following materials were added to the mixture and stirred for 120 minutes in a sand mill so as to be dispersed therein:

| | |
|---|---|
| Polyurethane (Samples obtained in Synthesis Examples 9 to 13) | 10 parts by weight (solid content) |
| Abrasive ($Al_2O_3$, particle size: 0.3 μm) | 2 parts by weight |
| Carbon black (particle size: 400 nm) | 2 parts by weight |
| Methyl ethyl ketone/toluene = 1/1 | 200 parts by weight |

Further, the following materials were added to the resulting dispersion:

| | |
|---|---|
| Polyisocyanate (Coronate 3041, manufactured by Nippon Polyurethane Industry Co., Ltd.) | 5 parts by weight (solid content) |
| sec-butyl stearate | 1 part by weight |
| Butoxyethyl stearate | 1 part by weight |
| Stearic acid | 1 part by weight |
| Methyl ethyl ketone | 50 parts by weight |

The mixture was further stirred for 20 minutes and then filtered through a filter having an average pore size of 1 μm to prepare a magnetic coating material. The resulting coating material was coated on the surface of a polyethylene terephthalate support of 10 μm in thickness by using a reverse roll so that the dry film thickness was 2.5 μm.

While the magnetic coating material was undried, the coated non-magnetic support was subjected to magnetic field orientation by using a magnet of 3,000 gauss and dried. Thereafter, the resulting magnetic recording medium was calendered by using a combination of 7 metal rolls (speed: 100 m/min; linear pressure: 300 kg/cm; and temperature: 90° C.), and then slit into a tape of 8 mm in width, thus preparing an 8-mm video tape as a sample.

Comparative Examples 5 to 7

8-mm video tapes were produced in the same way as in Example 5 except that the polyurethanes of Synthesis Examples 14 to 16 were used in place of the polyurethane of Example 5.

Comparative Example 8

An 8-mm video tape was produced in the same way as in Example 5 except that polybutadiene polyol (G-2000, manufactured by Nippon Soda Co., Ltd.) was used in place of the polyurethane of Example 5.

Comparative Example 9

An 8-mm video tape was produced in the same way as in Example 5 except that the following polyols were used in place of the polyurethane of Example 5:

| | |
|---|---|
| Polybutadiene polyol (C-1000, manufactured by Nippon Soda Co., Ltd.; number-average mol. wt.: 1,350 COOH group content: $133 \times 10^{-5}$ eq/g) | 1 part by weight |
| Polybutadiene polyol (C-3000, manufactured by Nippon Soda Co., Ltd.; number-average mol. wt.: 3,070 containing no COOH) | 9 parts by weight |

Comparative Example 10

An 8-mm video tape was produced in the same way as in Example 5 except that the following polyol and polyurethane were used in place of the polyurethane of Example 5:

| | |
|---|---|
| Polybutadiene polyol (C-3000, manufactured by Nippon Soda Co., Ltd.; number-average mol. wt.: 3,070 containing no COOH) Polyurethane (Synthesis Example 14) | 5 parts by weight |

Then, the characteristics of the video tapes thus produced were evaluated by the above-described measuring methods. The results of the evaluation are shown in Tables 6 and 7 below.

TABLE 6

| | Binder component | | Electromagnetic transducing characteristics S/N (dB) | Squareness ratio SQ | Surface roughness Ra (nm) |
|---|---|---|---|---|---|
| | Polyurethane | Polar group | | | |
| Ex. | | | | | |
| 5 | Syn. Ex. 9 | SO$_3$Na | 1.8 | 0.93 | 2.0 |
| 6 | Syn. Ex. 10 | SO$_3$Na | 1.9 | 0.94 | 2.3 |
| 7 | Syn. Ex. 11 | SO$_3$Na | 2.1 | 0.92 | 2.2 |
| 8 | Syn. Ex. 12 | COOH | 1.6 | 0.92 | 2.1 |
| 9 | Syn. Ex. 13 | SO$_3$Na | 1.5 | 0.93 | 2.0 |
| Comp. Ex. | | | | | |
| 5 | Syn. Ex. 14 | SO$_3$Na | ±0.0 | 0.88 | 3.6 |
| 6 | Syn. Ex. 15 | SO$_3$Na | −0.2 | 0.87 | 3.8 |
| 7 | Syn. Ex. 16 | SO$_3$Na | −0.6 | 0.86 | 3.8 |
| 8 | none | COOH | −0.6 | 0.83 | 4.8 |
| 9 | none | | −0.5 | 0.84 | 4.3 |
| 10 | Syn. Ex. 14 | SO$_3$Na | −0.2 | 0.85 | 3.9 |

TABLE 7

| | Repeated running durability | | | | Repeated running durability after 2 week storage at 60° C. & 90% RH (dB) |
|---|---|---|---|---|---|
| | 0° C. | | 40° C. | | |
| | 10% RH (dB) | 70% RH (dB) | 10% RH (dB) | 70% RH (dB) | |
| Ex. | | | | | |
| 5 | O−0.3 | O−0.3 | O−0.1 | O−0.4 | O−0.5 |
| 6 | O−0.2 | O−0.1 | O−0.1 | O−0.3 | O−0.6 |
| 7 | O−0.1 | O−0.3 | O−0.3 | O−0.2 | O−0.3 |
| 8 | O−0.3 | O−0.3 | O−0.2 | O−0.3 | O−0.4 |
| 9 | O−0.3 | O−0.3 | O−0.2 | O−0.3 | O−0.5 |
| Comp. Ex. | | | | | |
| 5 | Δ−1.3 | Δ−1.5 | Δ−1.4 | Δ−1.5 | X−3.8 |
| 6 | X−2.3 | X−2.8 | X−2.5 | X−2.5 | X−4.6 |
| 7 | X−1.8 | X−1.6 | X−1.9 | X−1.9 | X−3.5 |
| 8 | Δ−0.8 | Δ−0.9 | Δ−1.1 | X−1.1 | X−3.3 |
| 9 | Δ−0.9 | Δ−1.2 | Δ−1 | X−1.2 | X−3.8 |
| 10 | Δ−0.9 | Δ−0.8 | Δ−1.2 | Δ−0.8 | X−3.1 |

EXAMPLES 10 TO 17

The following materials were mixed and stirred for 12 hours in a disperse-stirrer to prepare an undercoating solution:

| | |
|---|---|
| [001f]Polyester resin (containing —SO$_3$Na group) Tg: 65° C. Na content: 4,600 ppm | 100 parts by weight |
| Cyclohexanone | 9,900 parts by weight |

The undercoating solution thus obtained was coated on a non-magnetic support of polyethylene terephthalate (thickness: 10 μm; F5 value: 20 kg/mm$^2$ in the MD direction and 14 kg/mm$^2$ in the TD direction; and Young's modulus: 750 kg/mm$^2$ in the MD direction and 470 kg/mm$^2$ in the TD direction) by a bar coater so that the dry film thickness was 0.1 μm.

In the meantime, an upper magnetic layer coating solution and a lower non-magnetic layer coating solution were prepared according to the following formulation: Formulation of the upper magnetic layer coating solution:

| | |
|---|---|
| Ferromagnetic powder Fe alloy powder (Fe—Co—Ni) Composition: Fe:Co:Ni = 92:6:2 Al$_2$O$_3$ used as an anti-sintering agent Hc: 16,00 Oe; : 119 emu/g Major axis length: 0.13 μm; acicular ratio: 7 Crystallite size: 17.2 nm; water content: 0.6 wt % | 100 parts by weight |
| Vinyl chloride copolymer —SO$_3$Na 8 × 10$^{-5}$ eq/g, containing —OH and epoxy groups Tg: 71° C.; polymerization degree: 300 Number-average mol. wt. (Mn): 12,000 weight-average mol. wt. (Mw): 38,000 | 13 parts by weight |
| Polyurethane resin (shown in Table 8) | 5 parts by weight |
| α-alumina Average particle size: 0.15 μm S$_{BET}$: 8.7 m$^2$/g; pH: 8.2 Water content: 0.06 wt % | 12 parts by weight |
| Cyclohexanone | 150 parts by weight |
| Methyl ethyl ketone | 150 parts by weight |

The above-described composition was mixed and dispersed for 6 hours in a sand mill. Thereafter, 5 parts by weight of polyisocyanate (Coronate L), 5 parts by weight of oleic acid, 7 parts by weight of stearic acid, and 15 parts by weight of butyl stearate were added to the resulting dispersion to obtain an upper magnetic layer coating solution.

Formation of the lower non-magnetic layer coating solution:

| | |
|---|---|
| TiO$_2$ Average particle size: 0.035 μm Crystalline form: rutile TiO$_2$ content: not lower than 90% Surface treatment layer: Al$_2$O$_3$ S$_{BET}$: 35 to 45 m$^2$/g True specific gravity: 4.1 pH: 6.5 to 8.0 | 85 parts by weight |
| Carbon black Average particle size: 160 nm DBP oil absorption: 80 ml/100 g pH: 8.0 S$_{BET}$: 250 m$^2$/g Tinting strength: 143% | 5 parts by weight |
| Vinyl chloride copolymer —SO$_3$Na 8 × 10$^{-5}$ eq/g, containing —OH and epoxy groups Tg: 71° C.; polymerization degree: 300 Number-average mol. wt. (Mn): 12,000 Weight-average mol. wt. (Mw): 38,000 | 13 parts by weight |
| Polyurethane resin (shown in Table 8) | 5 parts by weight |
| Cyclohexanone | 100 parts by weight |
| Methyl ethyl ketone | 100 parts by weight |

The above-described composition was mixed and dispersed for 4 hours in a sand mill. Thereafter, 5 parts by weight of polyisocyanate (Coronate L), 5 parts by weight of oleic acid, 5 parts by weight of stearic acid, and 15 parts by weight of butyl stearate were added to the resulting dispersion to obtain a lower non-magnetic layer coating solution.

The above-described coating solutions were coated in a wet state by using two doctors having different gaps. Thereafter, the wet coating was subjected to magnetic field orientation by using a permanent magnet of 3,500 gauss and then an electromagnet of 1,600 gauss and dried. Thereafter, supercalendering was carried out at a temperature of 80° C. by a combination of two metal rolls. The coating thicknesses of the magnetic and non-magnetic layers were 0.3 μm and 3.0 μm, respectively.

Then, a coating solution for a back coat layer was prepared according to the following formulation:

| | |
|---|---|
| Carbon black<br>$S_{BET}$: 220 m²/g<br>Average particle size: 170 nm<br>DBP oil absorption: 75 ml/100 g<br>Volatile content: 1.5%<br>pH: 8.0<br>Bulk density: 240.2 kg/m³ | 100 parts by weight |
| Nitrocellulose<br>RSI/2 (manufactured by Daicel Ltd.) | 100 parts by weight |
| Polyurethane | 30 parts by weight |
| Dispersant | |
| copper oleate | 10 parts by weight |
| copper phthalocyanine | 10 parts by weight |
| barium sulfate<br>(precipitable) | 5 parts by weight |
| Methyl ethyl ketone | 500 parts by weight |
| Toluene | 500 parts by weight |

The above-described composition was pre-kneaded and then kneaded in a roll mill. To 100 parts by weight of the composition obtained, the following additives were added and dispersed in a sand grinder:

| | |
|---|---|
| Carbon black<br>$S_{BET}$: 200 m²/g<br>Average particle size: 0.2 μm<br>DBP oil absorption: 36 ml/100 g<br>pH: 8.5 | 100 parts by weight |
| α-Al₂O₃<br>Average particle size: 0.2 μm<br>After filtration, the following composition<br>was added to 100 parts by weight of the<br>above-described composition to prepare a<br>coating solution: | 0.1 part by weight |
| Methyl ethyl ketone | 120 parts by weight |
| Polyisocyanate | 5 parts by weight |

The coating solution thus obtained was coated on the back surface of the non-magnetic support, which was reverse to the surface where the magnetic layer was provided, by a bar coater so that the dry film thickness was 0.5 μm. The magnetic recording medium obtained in this way was cut into a width of 8 mm, thereby preparing an 8-mm video tape. The characteristics of each sample video tape were measured by the same methods as in Examples 1 to 4. The results of the measurement are shown in Table 8 below.

Comparative Example 11

A video tape was prepared in the same way as in Example 10 except that polyester polyurethane was used as a polyurethane for both the upper magnetic layer and the lower non-magnetic layer. The characteristics of the video tape were measured in the same way as in Example 10. The results of the measurement are shown in Tables 8 and 9 below.

TABLE 8

| | Composition of binder | | | Electromagnetic transducing characteristics S/N (dB) | Squareness ratio SQ | Surface roughness Ra (nm) |
|---|---|---|---|---|---|---|
| Ex. | Lower non-mag. layer | Upper mag. layer | Back layer | | | |
| 10 | a | c | c | 0.8 | 0.88 | 2.9 |
| 11 | c | a | c | 2.3 | 0.92 | 2.4 |
| 12 | c | c | a | 0.6 | 0.88 | 2.8 |
| 13 | a | a | a | 2.4 | 0.92 | 2.0 |
| 14 | b | c | c | 0.7 | 0.88 | 2.9 |
| 15 | c | b | c | 2.1 | 0.92 | 2.5 |
| 16 | c | c | b | 0.7 | 0.88 | 3.8 |
| 17 | b | b | b | 2.3 | 0.92 | 2.1 |
| Comp. Ex. 11 | c | c | c | ±0 | 0.88 | 3.8 |

Polyurethane in the binder:
a: obtained from a polyolefin polyol
b: obtained from a polybutadiene polyol
c: polyester polyurethane

TABLE 9

| | Repeated running durability | | | | Repeated running durability after 2 week storage at 60° C. & 90% RH | Contamination on calender roll |
|---|---|---|---|---|---|---|
| | 0° C. | | 40° C. | | | |
| Ex. | 10% RH | 70% RH | 10% RH | 70% RH | | |
| 10 | Δ | Δ | | | Δ | Δ |
| 11 | ○ | ○ | ○ | ○ | ○ | ○ |
| 12 | | | | | Δ | Δ |
| 13 | ○ | ○ | ○ | ○ | ○ | ○ |
| 14 | | | | | Δ | Δ |
| 15 | ○ | ○ | ○ | ○ | ○ | ○ |
| 16 | | | | | Δ | Δ |
| 17 | ○ | ○ | ○ | ○ | ○ | ○ |
| Comp. Ex. 11 | Δ | Δ | Δ | X | X | Δ |

EXAMPLES 18 TO 23

Upper and lower magnetic layer coating solutions having the following compositions were prepared.

| | |
|---|---|
| Upper-layer solution: | |
| CO-γ-FeOx<br>(x = 1.45; major axis length: 0.20 μm<br>Ec: 950 Oe; and Br: 1,600 gauss) | 100 parts by weight |
| Vinyl chloride copolymer<br>(sulfonic acid group content: 0.25 wt %) | 10 parts by weight |
| Polyurethane | 5 parts by weight |
| Polyisocyanate (Coronate L) | 6 parts by weight |
| Stearic acid (for industrial use) | 1 part by weight |
| Butyl stearate (for industrial use) | 1 part by weight |
| α-alumina (particle size: 0.2 μm) | 10 parts by weight |
| Electrically conductive carbon<br>(particle size: 70 nm) | 1 part by weight |
| Methyl ethyl ketone/cyclohexanone<br>(=7/3) solvent | 200 parts by weight |

-continued

| Lower-layer solution (solution B): | |
|---|---|
| CO-γ-FeOx | 100 parts by weight |
| (x = 1.45; major axis length: 0.25 μm | |
| Hc: 850 Oe; and Br: 1,400 gauss) | |
| Vinyl chloride copolymer | 11 parts by weight |
| (sulfonic acid group content: 0.25 wt %) | |
| Polyurethane (shown in Table 10) | 4 parts by weight |
| Polyisocyanate (Coronate L) | 6 parts by weight |
| Stearic acid (for industrial use) | 1 part by weight |
| Butyl stearate (for industrial use) | 1 part by weight |
| Electrically conductive carbon | 5 parts by weight |
| (particle size: 20 nm) | |
| Methyl ethyl ketone/cyclohexanone | 200 parts by weight |
| (=7/3) solvent | |

The coating solutions were prepared by using a kneader, a sand grinder, etc., and coated on a non-magnetic support by a simultaneous multi-layer coating process. As the non-magnetic support, a polyethylene terephthalate film having a thickness of 14 μm and a center line average height (Ra) of 4 nm was used. After the coating process, the non-magnetic support was oriented in the longitudinal direction and then dried to obtain a bulk roll. The bulk roll thus obtained was further subjected to calender roll treatment. The calender roll treatment was carried out by using 7 stages of metal rolls having a Shore A hardness of 80 degrees and an Ra of 0.5 nm at a temperature of 80° C. and a linear pressure of 300 kg/cm. After the calender roll treatment, bulk thermo-treatment was carried out for 24 hours at 60° C. to cure the magnetic layers. Thereafter, the resulting magnetic recording medium was slit into a tape of ½ inch in width, thus obtaining a video tape. The surface roughnesses of the video tapes thus obtained were all in the range of from 5 nm to 6 nm. Each video tape obtained was incorporated in an S-VHS cassette to prepare a video cassette tape, and the characteristics thereof were measured by the same methods as in Examples 1 to 4. The results of the measurement are shown in Tables 10 and 11 below.

Comparative Example 12

A video tape was prepared in the same way as in Example 18 except that polyester polyurethane was used as a polyurethane for both the upper and lower magnetic layers. The characteristics of the video tape were measured in the same way as in Example 18. The results of the measurement are shown in Tables 10 and 11.

TABLE 10

| | Composition of binder | | Electro-magnetic transducing character-istics S/N (dB) | Square-ness ratio SQ | Surface roughness Ra (nm) |
|---|---|---|---|---|---|
| | Lower magnetic layer | Upper magnetic layer | | | |
| Ex. | | | | | |
| 18 | a | c | 0.9 | 0.84 | 4.7 |
| 19 | c | a | 1.0 | 0.88 | 4.8 |
| 20 | a | a | 1.5 | 0.89 | 4.1 |
| 21 | b | c | 0.8 | 0.84 | 4.7 |
| 22 | c | b | 1.0 | 0.88 | 4.9 |
| 23 | b | c | 1.6 | 0.88 | 4.2 |
| Comp. Ex. 12 | c | c | ±0 | 0.84 | 6.2 |

Polyurethane in the binder:

TABLE 10-continued

| | Composition of binder | | Electro-magnetic transducing character-istics S/N (dB) | Square-ness ratio SQ | Surface roughness Ra (nm) |
|---|---|---|---|---|---|
| | Lower magnetic layer | Upper magnetic layer | | | | a: obtained from a polyolefin polyol
b: obtained from a polybutadiene polyol
c: polyester polyurethane

TABLE 11

| | Repeated running durability | | | | Repeated running durability after 2 week storage at 60° C. & 90% RH | Contamination on calender roll |
|---|---|---|---|---|---|---|
| | 0° C. | | 40° C. | | | |
| | 10% RH | 70% RH | 10% RH | 70% RH | | |
| Ex. | | | | | | |
| 18 | Δ | Δ | Δ | Δ | Δ | Δ |
| 19 | ○ | ○ | ○ | ○ | Δ | ○ |
| 20 | ○ | ○ | ○ | ○ | Δ | Δ |
| 21 | Δ | Δ | Δ | Δ | Δ | Δ |
| 22 | ○ | ○ | ○ | ○ | ○ | Δ |
| 23 | ○ | ○ | ○ | ○ | ○ | ○ |
| Comp. Ex. 12 | Δ | Δ | Δ | Δ | X | Δ |

Thus, the polyurethane-containing binder of the present invention has high dispersibility, and it minimizes contamination on the rolls during the calendering process and also improves the squareness ratio and the surface roughness. As a result, the electromagnetic transducing characteristics improve.

In addition, it is possible to improve the repeated running durability under environmental conditions of from 0° C. to 40° C. and from 10% RH to 70% RH. An improvement in the repeated running durability has also been confirmed by an accelerated long-term shelf test carried out after 2-week storage under 60° C. and 90% RH.

What we claim is:

1. A magnetic recording medium having a magnetic layer containing a ferromagnetic powder, a binder and a curing agent on at least one surface of a non-magnetic support, wherein said binder comprises a polyurethane having a weight average molecular weight of 10,000 to 150,000 which is a reaction product obtained from a polyolefin polyol or a polybutadiene polyol having a molecular weight of 500 to 5000 and a polyisocyanate as principal raw materials, and wherein said polyurethane contains in a polyurethane molecule at least one polar group selected from the group consisting of $-SO_3M$, $-OSO_3M$, $-COOM$, $-PO_3M'_2$, $-OPO_3M'_2$, $-NR_2$, $-N^+R_3X^-$, $-N^+R_2R'SO_3^-$, and $-N^+R_2R'COO^-$ (where M is a hydrogen atom, an alkali metal ion, an alkali earth metal ion, or an ammonium ion; M' is a hydrogen atom, an alkali metal ion, an alkali earth metal ion, an ammonium ion, or an alkyl group; R and R' are each an alkyl group; and X is a halogen atom), and wherein the content of the polar group is from $1 \times 10^{-6}$ to $2 \times 10^{-4}$ equivalent per gram of the polyurethane.

2. The magnetic recording medium according to claim 1, wherein said polyol has a molecular weight of from 800 to 3,000.

3. The magnetic recording medium according to claim 1, wherein said polyisocyanate is an aromatic polyisocyanate selected from the group consisting of MDI (4,4'-diphenylmethane diisocyanate), TDI (tolylene diisocyanate), and XDI (xylene diisocyanate).

4. The magnetic recording medium according to claim 1, wherein the glass transition temperature (Tg) of said polyurethane is in the range of from −20° C. to +50° C.

5. The magnetic recording medium according to claim 1, wherein the reaction product is obtained from a polyolefin polyol.

6. The magnetic recording medium according to claim 5, wherein the polyolefin polyol content in said polyurethane is in the range of from 20 wt % to 90 wt %.

7. A magnetic recording medium having either a lower magnetic layer or a lower non-magnetic layer provided on at least one surface of a non-magnetic support, and an upper magnetic layer provided on said lower magnetic or non-magnetic layer, wherein at least either one of said magnetic and non-magnetic layers contains a binder for binding a ferromagnetic powder or a non-magnetic powder and a curing agent, said binder comprising a polyurethane having a weight average molecular weight of 10,000 to 150,000 which is a reaction product obtained from a polyolefin polyol or a polybutadiene polyol having a molecular weight of 500 to 5000 and a polyisocyanate as principal raw materials, and said curing agent comprises a polyisocyanate, and wherein said polyurethane contains in a polyurethane molecule at least one polar group selected from the group consisting of $-SO_3M$, $-OSO_3M$, $-COOM$, $-PO_3M'_2$, $-OPO_3M'_2$, $-NR_2$, $-N^+R_3X^-$, $-N^+R_2R'SO_3^-$, and $-N^+R_2R'COO^-$ (where M is a hydrogen atom, an alkali metal ion, an alkali earth metal ion, or an ammonium ion; M' is a hydrogen atom, an alkali metal ion, an alkali earth metal ion, an ammonium ion, or an alkyl group; R and R' are each an alkyl group; and X is a halogen atom), and wherein the content of the polar group is from $1\times10^{-6}$ to $2\times10^{-4}$ equivalent per gram of the polyurethane.

8. The magnetic recording medium according to claim 7, wherein the reaction product is obtained from a polyolefin polyol.

9. A magnetic recording medium having a magnetic layer containing a ferromagnetic powder, a binder and a curing agent on at least one surface of a non-magnetic support, wherein said binder comprises a polyurethane having a weight average molecular weight of 10,000 to 150,000 and a vinyl chloride synthetic resin, said polyurethane is a reaction product obtained from a polyolefin polyol or a polybutadiene polyol having a molecular weight of 500 to 5000 and a polyisocyanate as principal raw materials, and said curing agent comprises a polyisocyanate, and wherein said polyurethane contains in a polyurethane molecule at least one polar group selected from the group consisting of $-SO_3M$, $-OSO_3M$, $-COOM$, $-PO_3M'_2$, $-OPO_3M'_2$, $-NR_2$, $-N^+R_3X^-$, $-N^+R_2R'SO_3^-$, and $-N^+R_2R'COO^-$ (where M is a hydrogen atom, an alkali metal ion, an alkali earth metal ion, or an ammonium ion; M' is a hydrogen atom, an alkali metal ion, an alkali earth metal ion, an ammonium ion, or an alkyl group; R and R' are each an alkyl group; and X is a halogen atom), and wherein the content of the polar group is from $1\times10^{-6}$ to $2\times10^{-4}$ equivalent per gram of the polyurethane.

10. The magnetic recording medium according to claim 9, wherein the degree of polymerization of said vinyl chloride synthetic resin is in the range of from 200 to 600.

11. The magnetic recording medium according to claim 9, wherein the content of said vinyl chloride synthetic resin is not higher than 80 wt %.

12. The magnetic recording medium according to claim 9, wherein the content of the polyisocyanate compound as the curing agent contained in said magnetic layer is in the range of from 10 wt % to 50 wt %.

13. The magnetic recording medium according to claim 9, wherein the total amount of the resin component and the curing agent is in the range of from 15 parts to 40 parts by weight per 100 parts by weight of the ferromagnetic powder.

14. The magnetic recording medium according to claim 9, wherein said ferromagnetic powder is a ferromagnetic iron oxide powder, a cobalt-containing ferromagnetic iron oxide powder, or a ferromagnetic alloy powder which has a $S_{BET}$ specific surface area of not less than 40 m²/g.

15. The magnetic recording medium according to claim 9, wherein said ferromagnetic powder has a crystallite size of not larger than 35 nm.

16. The magnetic recording medium according to claim 9, wherein said ferromagnetic powder is selected from the group consisting of Fe, Ni, Fe—Co, Fe—Ni, Co—Ni, Co—Ni—Fe, Ba—Fe, $CrO_2$ and alloys containing aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, mercury, lead, phosphorus, lanthanum, cerium, praseodymium, neodymium, tellurium or bismuth in an amount of not more than 20 wt % of the metal component.

17. The magnetic recording medium according to claim 9, wherein said magnetic recording layer further comprises an abrasive, an antistatic agent or a lubricant.

18. The magnetic recording medium according to claim 9, wherein the reaction product is obtained from a polyolefin polyol.

* * * * *